United States Patent [19]

Rubin et al.

[11] 3,865,746

[45] Feb. 11, 1975

[54] $UO_2$ BeO FUEL PROCESS

[75] Inventors: Jack A. Rubin, Encino; Peter D. Johnson, Chatsworth, both of Calif.

[73] Assignee: The United States of America as represented by the U.S. Atomic Energy Commission, Washington, D.C.

[22] Filed: July 16, 1959

[21] Appl. No.: 827,661

[52] U.S. Cl...... 252/301.1 W, 252/301.1 R, 264/.5, 423/5, 176/71
[51] Int. Cl.......................................... C09k 3/00
[58] Field of Search............. 204/193.234, 154.234; 23/14.5 A; 252/301.1 R, 301.1 W; 264/.5; 423/5; 176/71

[56] References Cited
UNITED STATES PATENTS

| | | | |
|---|---|---|---|
| 2,737,445 | 3/1956 | Nossen | 423/390 |
| 2,757,072 | 7/1960 | Kopp et al. | 423/393 |
| 2,766,032 | 10/1956 | Meister | 432/264 |
| 2,816,042 | 12/1959 | Hamilton | 106/55 |
| 2,818,605 | 1/1958 | Miller | 106/55 |
| 2,868,707 | 1/1959 | Alter et al. | 252/301.1 R |
| 2,893,859 | 7/1959 | Triffleman | 75/211 X |

FOREIGN PATENTS OR APPLICATIONS
788,284   12/1957   Great Britain

OTHER PUBLICATIONS

AEC Document TID-7546, Book 2, Mar. 1958, pp. 400, 446-447.

RCAOI – Proceedings of the 2nd U.N. Conference on the Peaceful Uses of Atomic Energy, Published by the United Nations, 1958, Vol. 6, p. 548.

Atomic Energy Commission Document BMI-1117. July 24, 1956, pp. 13-19, Available from U.S. Atomic Energy Commission, Technical Information Extension, P.O. Box 1001, Oak Ridge, Tenn.

*Primary Examiner*—Benjamin R. Padgett
*Assistant Examiner*—R. E. Schafer
*Attorney, Agent, or Firm*—John A. Horan; F. A. Robertson

EXEMPLARY CLAIM

1. A method of forming a $UO_2$-BeO ceramic body which comprises melting together uranium nitrate and beryllium nitrate to a temperature of approximately 50°–100°C, heating the resulting melt until a homogeneous mixture of beryllium oxide and uranium oxide is obtained, hot-pressing the resulting composition at approximate conditions of 1,200°–2,000°C, at a pressure of 1,000 to 6,000 psi for one-half to 6 hours.

4 Claims, No Drawings

UO₂ BEO FUEL PROCESS

Our invention relates to an improved method of making a homogeneous $UO_2$-$BeO$ reactor fuel composition, and more particularly to a molten salt process of preparing a $UO_2$-$BeO$ ceramic reactor fuel composition.

Beryllium and beryllium oxides possess excellent neutron moderating characteristics. Both $UO_2$ and $BeO$ are good refractories, even under oxidizing conditions at elevated temperatures. Heretofore, $UO_2$-$BeO$ has been prepared by mechanical mixing $UO_2$ and $BeO$, and sintering the resulting mixture to produce a ceramic composition. $UO_2$ tends to migrate out of such a ceramic when subjected to moving air at a temperature of 400° to 800°C. In addition to having undesirable high temperature-oxidation characteristics, such material shows decrepitation and volume increases when subjected to elevated temperatures.

It is, accordingly, an object of our present invention to provide an improved method of fabricating a mixture of $UO_2$ and $BeO$.

Another object of our present invention is to provide an improved method of preparing a $UO_2$-$BeO$ ceramic composition wherein $UO_2$ loss upon exposure to oxidizing conditions at elevated temperatures is minimized.

Still another object is to provide a method of preparing a $UO_2$-$BeO$ mixture of high density and dimensional stability by a molten salt method.

Yet another object is to provide a molten salt method of producing $UO_2$-$BeO$ composition of high quality and excellent oxidation resistance.

Further objects and advantages of our invention will become apparent from the following detailed description.

In accordance with our present invention, a $UO_2$-$BeO$ fuel composition may be prepared by melting together compounds of beryllium and uranium, heating the resulting mixture to form a homogeneous mixture of uranium oxide and beryllium oxide, and thereafter reducing the resulting composition to yield a finely dispersed mixture of $UO_2$ in the $BeO$ matrix.

The practice of our invention achieves a $UO_2$-$BeO$ fuel composition of high quality and dimensional stability, in which $UO_2$ loss at elevated temperatures under oxidizing conditions is minimized. Apparently, the $UO_2$ is enclosed within the $BeO$ grain, rather than along the grain boundaries as previously; this serves to protect the $UO_2$ from the oxidizing medium. Our process is relatively simple since it can be carried out in a single crucible, and without use of additional chemical reagents. Thus, problems associated with the handling of large volumes of toxic beryllium solutions are eliminated, and cost savings are realized.

The beryllium and uranium compounds which can be used as the starting materials in our invention are readily decomposable inorganic and organic salts. An example of an organic compound is the acetate. The organic compounds, however, are relatively more volatile, which creates complications with toxic beryllium. Organic compounds are also usually of greater molecular weight and hence larger volumes of material must be handled. Therefore, we find that relatively low melting point inorganic compounds are preferred. The inorganic compounds, in addition to being relatively low melting, should form decomposition products (after melting) which are relatively volatile, to avoid anion impurities in the final product. Examples of satisfactory inorganic compounds are nitrates, halides, and the hydroxides when mixed with the nitrates. The nitrate salts are preferred because of their low melting point, and ready decomposition into volatile nitrogen oxides such as $NO_2$. The uranium may be present in any valence state in the salt such as the uranous (+4) ion or the uranyl (+6) ion. The preferred compounds for use in our invention are $Be(NO_3)_2 \cdot 3H_2O$ and $UO_2(NO_3)_2 \cdot 6H_2O$.

These compounds may be melted together in an infinite composition range. The actual composition range will depend upon the particular reactor application intended, and the enrichment of the uranium. When using highly enriched uranium, e.g., about 90% U-235, $UO_2$ weight percentages in the final product may vary between 1 and 25%, and frequently range between 5 and 15 weight per cent $UO_2$.

The beryllium and uranium salts are melted together with constant stirring, or one of the components is melted first with the addition of the other in either molten (liquid) or solid (crystalline) form with constant stirring to the first. When hydrated beryllium and uranyl nitrate salts are employed, the melting and solution takes place in the range of from approximately 50° – 100°C. The melting operation may be performed in air, in an inert atmosphere such as a noble gas, e.g., helium, or in another neutral gas such as nitrogen. The melting may also be conducted in a vacuum. After the melt is obtained, the resulting mixture is then heated to the dissociation point to break down the compounds to form a finely dispersed mixture of uranium oxides in $BeO$. By the term "uranium oxides," such oxides as $UO_2$, $UO_3$, $U_3O_8$, $U_4O_9$, or the like, or any mixture thereof, is intended. The dissociation reaction may be carried out in any of the above atmosphere; likewise, it may be carried out under vacuum conditions to lower the partial pressure of gas above the system. This permits the dissociation to be carried out at a lower temperature, and yields a product which is more finely divided than that obtained in air. The final form of the uranium oxide obtained in the decomposition step depends upon the temperature and environmental atmosphere. Thus, formation of $UO_3$ takes place in a temperature range of approximately 200°–500°C, $U_3O_8$ is obtained in the range of 750°–1,000°C in an oxidizing atmosphere, and $UO_2$ is obtained in the range of 500°–1,800°C in a reducing atmosphere such as $CO$, $H_2$, or $NH_3$.

Although the uranium may be satisfactorily directly converted to $UO_2$ at this point by the more vigorous treatment, and the resulting $UO_2$-$BeO$ converted into a ceramic body without sintering, we find that a relatively milder treatment with formation of $UO_3$ or a mixture of uranium oxides leads to a final $UO_2$-$BeO$ ceramic of smaller grain size and higher quality. Therefore, conducting the decomposition in the temperature range of 200°–500°C, with 250°C being optimum, until the material decomposes to the oxides, which normally takes about 1 hour, is preferred.

After the uranium-beryllium oxide powder is thus obtained, it may then be fabricated into a product form by any known ceramic technique, such as cold pressing, slip casting, extrusion and isostatic pressing, followed by sintering in air, hydrogen, nitrogen or noble gases. We find that hot pressing is the preferred forming method, and products approaching theoretical density may be thereby obtained. The hot pressing may be conducted over a wide temperature, pressure and time range. For example, the material may be hot pressed at approximate conditions of 1,200°–2,000°C, at a pressure of 1,000 to 6,000 psi, for periods of time ranging between one-half to 6 hours. The preferred method encompasses hot pressing at approximate conditions of 1,200°C at 4,000 psi for 4 hours. The hot pressing reduces any higher uranium oxides present to $UO_2$ and yields a ceramic body in which the great majority of the $UO_2$ particles are dispersed within a matrix of BeO grains. The above treatment yields a ceramic body superior in temperature, dimensional, and oxidation resistance in which $UO_2$ retention is markedly superior to hot pressed powders obtained with mechanical mixing of $UO_2$ and BeO. However, still further improvement in fuel retention characteristics can be obtained by heat treating (annealing) the resulting ceramic bodies in a reducing atmosphere. For example, the hot-pressed ceramic body obtained above is annealed at temperatures of approximately 1,400°C to 1,900°C for approximately ½–4 hours in hydrogen, CO, or $NH_3$. Annealing at 1,800°C for 1 hour in a hydrogen atmosphere is preferred.

In a preferred form of our invention, beryllium nitrate trihydrate and uranyl nitrate hexahydrate are melted together at approximately 60°C under vacuum. The resulting melt is then heated under vacuum at a temperature of approximately 250°C for approximately 1 hour until the material is completely decomposed to the oxides. The oxide mixture is then hot pressed at approximate conditions of 1,200°C and 4000 psi for four hours in an inert gas atmosphere. The ceramic body thus obtained is annealed in flowing hydrogen at 1,800°C for 1 hour.

The following specific examples are offered in order to illustrate our invention in greater detail.

EXAMPLE 1

19.60 gms of $Be(NO_3)_2 \cdot 3H_2O$ (c.p. grade) were placed in a 30 ml fused silica crucible. A chromel-alumel thermocouple was taped to the outside of the crucible with glass tape. The bead of the thermocouple was positioned near the bottom of the crucible in order that it would be adjacent to the molten material. The thermocouple lead wires were connected to a 0°C reference (ice-water bath) and then to a recording potentiometer which automatically recorded the temperature of the sample verus time. To keep the temperature of the sample nearly uniform the 30 ml crucible was placed in a sand bath (99+% $SiO_2$, 80–120 mesh), made by almost completely submerging the crucible in a 200 ml iron crucible filled with sand. The sand bath was placed on a hot plate and surrounded by a sheet of asbestos paper formed into the shape of a truncated hollow cone. The asbestos served to keep the sand bath at a nearly uniform temperature.

The temperature of the hot plate was slowly increased until the $Be(NO_3)_2 \cdot 3H_2O$ melted (approximately 60°C). When a clear homogeneous melt was obtained 0.258 gms of $UO_2(NO_3)_2 \cdot 6H_2O$ were added. The $UO_2(NO_3)_2 \cdot 6H_2O$ dissolved in the molten $Be(NO_3)_2 \cdot 3H_2O$, forming a clear yellow homogeneous liquid. As the temperature increased, bubbles of $H_2O$ vapor started to form in the melt at approximately 100°C. The evolution of water vapor continued until a temperature of approximately 200°C was reached. At approximately 225°C oxides of nitrogen, e.g., $NO_2$, formed as the melt thickened with the formation of BeO and $UO_3$. The evolution of nitrogen oxides continued until the last traces of a liquid phase disappeared and an intimate mixture of $UO_3$ and BeO formed. The crucible was heated to a maximum of 280°C to drive off the majority of the volatile constituents. The resulting mixture was then dried for four hours at 110°C. The total weight of materials used, both $UO_2(NO_3)_2 \cdot 6H_2O$ and $Be(NO_3)_2 \cdot 3H_2O$, was approximately 19.86 gms. The weight of the product after melting and decomposition was 3.6 gms. This resulted in a total loss in weight of 16.26 gms or 81.8 W/O based on the starting materials. The resulting product, an intimate mixture of beryllium and uranium oxides, was removed from the original crucible and ground to a light, fluffy, creme-colored powder in a high-alumina mortar.

The powder was loaded into a nine sixteenth inch diameter graphite hot press die and pressed for four hours at 4,000 psi and 1,200°C. The full pressure was applied when the die reached approximately 800°C (red heat). The finished nine sixteenth inch diameter right circular cylinder was measured for density. The density was 3.03 gm-cm$^{-3}$ which is 97.1 percent of the calculated theoretical density (3.12 gm-cm$^{-3}$). Disks nine sixteenth inch in diameter and one sixteenth inch thick were cut from the cylinder with a diamond saw. These disks were annealed in flowing hydrogen for one hour at the following temperatures: 1,500°C, 1,670°C, and 1,770°C. The hydrogen treated disks were tested for their fuel retention characteristics by subjecting them for four hours at 1,650°C to dry (−80°C dew point) air flowing at a rate of 2.5 cubic feet per hour. The test results under these severe conditions are shown below:

| Annealing Temp. | Fuel Loss as W/O $UO_2$ |
| --- | --- |
| 1500 | 66 |
| 1670 | 38 |
| 1770 | 30 |

Control specimens, mechanically mixed, hot-pressed and annealed, lost 100 percent of their $UO_2$ under the same conditions. 865.3 gms of $Be(NO_3)_2 \cdot 3H_2O$ and 11.35 gms of $UO_2(NO_3)_2 \cdot 6H_2O$ were placed in a 150 mm Pyrex crystallizing dish. The amounts of beryllium and uranium nitrates added were equivalent to a composition of 95 W/O BeO-5 W/O $UO_2$. The crystallizing dish was placed on a hot plate and the temperature was slowly increased. A 0°–500°C nitrogen filled mercury thermometer was placed into the mass of crystals to indicate the temperatures during the melting and decomposition of the fused nitrates. At approximately 60°C the crystalline nitrates melted forming a clear homogeneous yellow liquid. At 100°C the melt started to decompose by the evolution of water vapor. The temperature of the melt increased until approximately 140°C was reached. At this temperature a thermal arrest occurred during which time the greatest portion of the water vapor was evolved. The temperature then increased until 180°C was reached. At this temperature there was a thickening of the melt accompanied by a large evolution of $NO_2$. The melt then formed into a solid mass of beryllium and uranium oxides as the decomposition approached completion.

The intimate mixture of beryllium and uranium oxides thus formed was dried for 5 hours to remove the last traces of volatile material. The total weight of the starting materials, viz. $Be(NO_3)_2 \cdot 3H_2O$ and $UO_2(NO_3)_2 \cdot 6H_2O$ was approximately 876.7 gms. The total weight of the mixture prepared from the melt was 126.6 gms. The total loss in weight, therefore, was 750.1 gms or 85.7 percent. The calculated loss in weight was 86.2 percent. The experimental results, therefore, agreed very well with those predicted from theoretical calculations.

The powder was vacuum dried for 15 hours at 90°C. 102.0 gms of the dried powder were loaded into a 2-3/16 inch diameter graphite hot-pressing die. The sample was pressed for 4 hours at 2,000 psi and 1,400°C. The finished hot pressed block was in the shape of a right circular cylinder 2-3/16 inch in diameter and 5/16 inch thick. The density measured on a rectangular block machined from the center of the block was 2.98 gm-cm$^{-3}$ which is 95.5 percent of the calculated theoretical density.

Small slabs approximately ½inch × 5/16 inch × 1/6 inch were cut from the block with a diamond saw to prepare fuel-retention test samples. The slabs were tested for their fuel retention characteristics by subjecting them at 1,650°C to dry (−80°C density point) air flowing at the rate of 2.5 cubic feet per hour for 4 hours.

The material in the as-hot-pressed condition lost 65 W/O of its fuel while material which had been pretreated by annealing for one hour in flowing hydrogen at 1,800°C lost only 20 W/O of its fuel in the fuel retention test. Mechanically mixed, hot pressed and annealed control specimens lost 100 percent of their $UO_2$ under the same severe conditions.

Having thus described our invention, we claim:

1. A method of forming a $UO_2$-BeO ceramic body which comprises melting together uranium nitrate and beryllium nitrate to a temperature of approximately 50°–100°C, heating the resulting melt until a homogeneous mixture of beryllium oxide and uranium oxide is obtained, hot-pressing the resulting composition at approximate conditions of 1,200°–2,000°C, at a pressure of 1,000 to 6,000 psi for one-half to six hours.

2. The method of claim 1 wherein the resulting $UO_2$-BeO ceramic body is subsequently annealed in a reducing atmosphere at a temperature of approximately 1,400°C to 1,900°C for approximately one-half to 4 hours.

3. A method of forming a $UO_2$-BeO ceramic reactor fuel composition, which comprises melting together beryllium nitrate trihydrate and uranyl nitrate hexahydrate at approximately 60°C under vacuum, heating the resulting mixture under vacuum at a temperature of approximately 250°C for approximately 1 hour until the melt is decomposed to a homogeneous mixture of uranium oxide and beryllium oxide, hot-pressing the resulting composition at approximate conditions of 1,200°C and 4,000 psi for 4 hours in an inert gas atmosphere, and then annealing the resulting ceramic body in hydrogen at approximately 1,800°C for approximately 1 hour.

4. A method of forming a $UO_2$-BeO ceramic body which comprises melting together uranium nitrate and beryllium nitrate at a temperature of about 50°–100°C under vacuum, heating the resulting melt under vacuum at a temperature of 200°–500°C until a homogeneous mixture of beryllium oxide and uranium oxide is obtained, hot pressing the resulting composition at a temperature of approximately 1,200°–2,000°C at a pressure of approximately 1,000–6,000 psi for approximately ½ to 6 hours in an inert gas atmosphere, and then annealing the resulting ceramic body in a reducing atmosphere at a temperature of approximately 1,400°–1,900°C for approximately ½ to 4 hours.

* * * * *